(12) United States Patent
Ben-Nun et al.

(10) Patent No.: US 7,436,830 B2
(45) Date of Patent: *Oct. 14, 2008

(54) METHOD AND APPARATUS FOR WIRE-SPEED APPLICATION LAYER CLASSIFICATION OF UPSTREAM AND DOWNSTREAM DATA PACKETS

(75) Inventors: Michael Ben-Nun, Ramat Hasharon (IL); Sagy Ravid, Zichron Yakuv (IL); Itzhak Barak, Kadima (IL); Offer Weil, Aderer (IL)

(73) Assignee: P-CUBE Ltd., Herzlia (IL)

( * ) Notice: Subject to any disclaimer, the term of this patent is extended or adjusted under 35 U.S.C. 154(b) by 720 days.

This patent is subject to a terminal disclaimer.

(21) Appl. No.: 10/953,562

(22) Filed: Sep. 30, 2004

(65) Prior Publication Data

US 2005/0190694 A1    Sep. 1, 2005

Related U.S. Application Data

(63) Continuation-in-part of application No. 09/541,598, filed on Apr. 3, 2000, now Pat. No. 6,831,893, which is a continuation-in-part of application No. 09/547,034, filed on Apr. 11, 2000, now abandoned.

(51) Int. Cl.
*H04L 12/56* (2006.01)
(52) U.S. Cl. .................. 370/389; 370/235; 370/252
(58) Field of Classification Search .......... 370/382, 370/389, 392, 393, 395.54, 235, 229, 395.31, 370/395.32; 711/216, 108, 220; 709/200, 709/220–253
See application file for complete search history.

(56) References Cited

U.S. PATENT DOCUMENTS

| | | | | |
|---|---|---|---|---|
| 4,788,656 A | * | 11/1988 | Sternberger | 710/52 |
| 4,996,663 A | * | 2/1991 | Nemes | 707/200 |
| 5,414,704 A | * | 5/1995 | Spinney | 370/389 |
| 5,617,421 A | | 4/1997 | Chin et al. | |
| 5,806,086 A | | 9/1998 | Kimmel et al. | |
| 5,842,040 A | | 11/1998 | Hughes et al. | |

(Continued)

OTHER PUBLICATIONS

T.V. Lakshman et al, High-Speed Policy-Based Packet Forwarding Using Efficient Multi-Dimensional Range Matching, 1998, ACM SIGCOMM Computer Communication Review, vol. 28. No. 4, pp. 203-221.*

*Primary Examiner*—Ricky Ngo
*Assistant Examiner*—Gary Mui
(74) *Attorney, Agent, or Firm*—Abelman, Frayne & Schwab (57) ABSTRACT

A data packet classifier to classify a plurality of N-bit input tuples, said classifier comprising a hash address, a memory and a comparison unit. The hash address generator generate a plurality of M-bit hash addresses from said plurality of N-bit input tuples, wherein M is significantly smaller than N. The memory has a plurality of memory entries and is addressable by said plurality of M-bit hash addresses, each such address corresponding to a plurality of memory entries, each of said plurality of memory entries capable of storing one of said plurality of N-bit tuples and an associated process flow information. The comparison unit determines if an incoming N-bit tuple can be matched with a stored N-bit tuple. The associated process flow information is output if a match is found and wherein a new entry is created in the memory for the incoming N-bit tuple if a match is not found.

64 Claims, 4 Drawing Sheets

U.S. PATENT DOCUMENTS

| | | |
|---|---|---|
| 5,898,837 A | 4/1999 | Guttman et al. |
| 5,946,302 A | 8/1999 | Waclawsky et al. |
| 5,956,721 A | 9/1999 | Douceur et al. |
| 5,995,488 A | 11/1999 | Kalkunte et al. |
| 5,995,971 A | 11/1999 | Douceur |
| 6,104,696 A | 8/2000 | Kadambi et al. |
| 6,185,208 B1 * | 2/2001 | Liao ........................... 370/392 |
| 6,275,861 B1 * | 8/2001 | Chaudri et al. .............. 709/238 |
| 6,341,130 B1 * | 1/2002 | Lakshman et al. .......... 370/389 |
| 6,434,153 B1 | 8/2002 | Yazaki et al. |
| 6,542,508 B1 | 4/2003 | Lin |
| 6,590,894 B1 * | 7/2003 | Kerr et al. ................... 370/392 |
| 6,629,141 B2 | 9/2003 | Elzur et al. |
| 6,854,117 B1 | 2/2005 | Roberts |
| 6,928,482 B1 | 8/2005 | Ben-Nun et al. |
| 7,010,611 B1 * | 3/2006 | Wiryaman et al. .......... 709/232 |
| 2002/0016856 A1 | 2/2002 | Tallegas et al. |
| 2004/0071135 A1 | 4/2004 | Jimmei et al. |

* cited by examiner

METHOD AND APPARATUS FOR WIRE-SPEED APPLICATION LAYER CLASSIFICATION OF UPSTREAM AND DOWNSTREAM DATA PACKETS

RELATED APPLICATIONS

This application is a continuation-in-part of U.S. application Ser. No. 09/541,598 entitled as "An Apparatus for Wire-Speed Classification and Pre-Processing of Data Packets in a Full Duplex Network" filed by M. Ben-Nun et al., on Apr. 3, 2000 now U.S. Pat. No. 6,831,893, now allowed, the contents of which are incorporated herein by reference, and is also a continuation-in-part of U.S. application Ser. No. 09/547,034 entitled "A method and Apparatus for Wire-Speed Application Layer Classification of Data Packets" filed by M. Ben-Nun et al., on Apr. 11, 2000 now abandoned, the contents of which are incorporated herein by reference.

I. DESCRIPTION OF THE INVENTION

A. Field of the Invention

The present invention relates generally to the classification of packets in a full duplex communication system, and more specifically to high speed digital communication networks transporting packets which may be monitored at the application level of the communication model where wire speed handling of the packet is required. The present invention is embodied in a network system, a data classifier, a method for hashing and computer program products for enabling a computer to perform data packet classification.

B. Background of the Invention

In most communication networks used for exchanging messages between a source and a destination, a message in a digital form is divided into multiple packets for faster and more convenient transmission and for reducing errors. Examples of such communication networks are the Internet, Wide and Local Area Networks. The digital packets are then transmitted over the network between a source computer and a destination computer. It should be noted that the source and destination could be personal computers or servers and the like.

Figure 1:
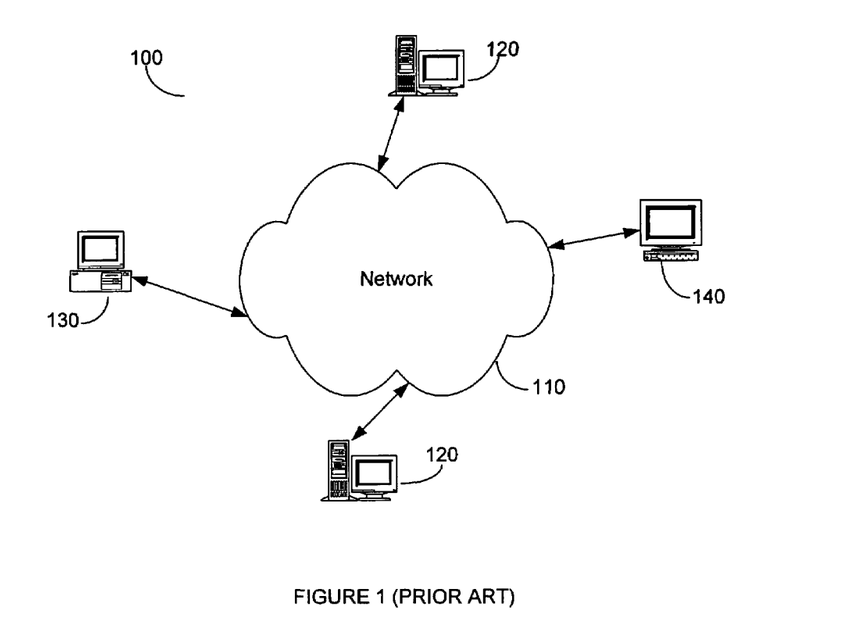
FIG. 1 shows a preferred embodiment of a network system according to the present invention.

A modern day computer network system comprises a substantial number of individual computers and servers. A simple computer network 100 is shown in FIG. 1. Typically, a computer, for example computer 130, can act as both a source and a destination. Computer sending a data packet, for example computer 130, is a source and a computer receiving a packet, for example a server 120, is a destination. The same computer that acted as a source in a packet transfer could act as a destination for another packet. A computer acting as a router acts as both the source and a destination for a packet. This is because it receives a packet from a different source and then simply routes it to a different computer. For example, server 120 may act as a router between computer 130 and workstation 140.

Often, each of the computers in network 110 format least part of a "node" of the network, and data is transferred among the various nodes by transmitting data packets among the computers. For example, a first computer located at a first node, for example server 120, may run a first application program that generates first data to be subsequently processed by a second computer at a second node, for example workstation 140. In order to transfer the first data to the second computer so that it can be processed, the first computer divides the first data into a plurality of data segments and forms a data packet corresponding to each of the data segments. Then, the data packets are transmitted downstream from the first computer to the second computer. Also, if the network is capable of full duplex communications, the second computer may transmit data packets upstream to the first computer in response to the data packets received from the first computer.

Figure 2:
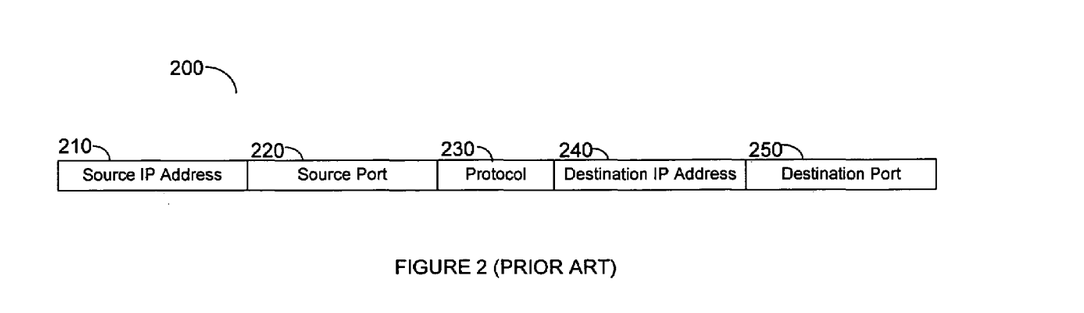
FIG. 2 shows an example of a tuple or a header (PRIOR ART).

Each of the data packets transmitted from the first computer to the second computer (and transmitted from the second computer to the first computer) typically contains a data packet header. The headers are often referred to as tuples. The header often includes data that identifies the type of data contained in the data packet, the source computer from which the data packet was transmitted, the intended destination computer of the data packet, etc. An example of a data packet header is illustrated in FIG. 2.

As shown in the figure, a header 200 comprises a source internet protocol ("IP") address field 210, a destination IP address field 240, a protocol field 230, a source port field 220, and a destination port field 250. The source IP address field 210 contains a 32-bit source IP address that identifies the source computer transmitting the data packet. The destination IP address field 240 contains a 32-bit destination address that identifies the intended destination computer of the data packet. The protocol field 230 contains eight bits of protocol data that identify the data format and/or the transmission format of the data contained in the data packet. The source port field 220 includes sixteen bits of data that identify the computer port that physically outputs the data packet, and the destination port field 250 contains sixteen bits of data that represent the computer port that is supposed to input the data packet. The tuple uniquely defines the path between the source and destination and therefore defines the origin and target for the packet being sent.

When data packets are transmitted over the network from the source computer to the destination computer, they are input by various network components that process the data packets and direct them to the appropriate destination computer. Such network components may be included in the destination computer and/or may be contained in an intermediate computer that processes the data as it is being transmitted from the source computer to the destination computer. If the data packets can be quickly and efficiently processed and routed between the various nodes of the network, the operation of the entire network is enhanced. For example, by quickly and efficiently transmitting data packets to the destination computer, the quality of real-time applications such as internet video conferencing and internet voice conferencing is improved. Also, the network components can quickly process the data packets to determine if they are authorized to be transmitted to the destination computer, and if they are not, the network components discard the data packets. As a result, the security of the network is greatly enhanced.

Before processing a data packet, a network component must "classify" the data packet according to various characteristics of the data packet and/or the data contained in the packet. Then, the network component processes the data packet based on its classification.

The packets of data that flow among the computers that form part of the network can be considered to carry portions of digital information between the different nodes of the network. For example, an application may be running at a computer in one node of the network. The results of such an application may be sent to a computer in a different node of the computer. The information is divided into one or more packets before the data is transferred over the respective network. In the full form of communication, such packets are run upstream and then down stream in order to verify a full response loop. In many systems it is required to analyze the packets flowing back and forth for better network management and system administration, and other application related activities such as billing, prioritizing, and the like.

In a robust high speed network, typically millions of data packets are sent and received by a node ever second. Therefore, the network is required to process millions of such packets. It is clear that these packets must be processed at wire speed so that the transmission of the packet is efficient. For example, in an efficient network the speed of transmission of data will be approximately the same as the speed at which a packet is processed by a node. In other words, the packets are processed at the maximum speed at which they can be transmitted through the network. The ability to process at wire speed allows the system to work without performance degradation. As the bit rate of the network increases (for example networks capable of speeds 1 Gbs are already in use) the number of packets requiring processing also increases.

An important requirement of a good network is that the packets reach their desired destination. The packets should also be prevented from reaching the wrong destination. Theoretically, the best way of doing so is to use the full 104 bit provided as a unique address, however, this approach is impractical as described below.

A large tuple, for example a 104-bit wide tuple, will enable the precise description of the source and destination nodes, the input and output ports as well as the protocol used. However, such a large tuple in turn creates a large address space. For example a 104-bit wide tuple would require an address space of $2^{104}$ addresses. But then, such a large address space would require addressing a memory using a large tuple. Such a large address would result in huge memory requirements and very inefficient usage of the memory. Therefore, an important challenge is to effectively prevent the need to use such a large tuple for addressing the memory.

A commonly used technique employs hash tables or other hashing techniques. In such a hashing technique, address or location of an identifier is obtained by computing some arithmetic function of the identifier. This arithmetic function is called a hashing function. A hashing function essentially transforms an identifier into an address in the hash table. For example, if X is an identifier, f(X) gives the address of the identifier in the hash table. The memory available to maintain the hash table is normally assumed to be sequential. Also hash table is normally partitioned into hash buckets. The buckets in turn have one or more slots each capable of holding exactly one record. Therefore, if there are b buckets in the hash table, the transformation f(X) transforms X into an integer 0 through b-1. Since the number of possible identifiers are much larger than the number of buckets there is a distinct possibility that two different identifiers are mapped to the same bucket. For example, if $I_1$ and $I_2$ are two different identifiers it is possible that $f(I_1)=f(I_2)$. There is also a likelihood that a bucket can overflow if more identifiers get allotted to the bucket than the number of slots available in the bucket. The desired properties of a hash function are that it be easily computable and that it minimizes the number of collisions.

Several conventional approaches use hashing techniques to store tuples. However, the conventional techniques are deficient in that they lack the capability of truly operating at wire speed. Furthermore, none of the conventional techniques can handle over one million different process flows and the full tuple range, as noted, for example, by Lakshman et. al in "High-Speed Policy-based Packet Forwarding Using Efficient Multi-Dimensional Range Matching", page 205, $1^{st}$ column, $2^{nd}$ paragraph. Some of the conventional techniques use several sequential steps that either grow linearly or exponentially with the number of process flows identified. On the other hand, several other conventional techniques require complex resources in order to store tuples using hashing techniques. A disadvantage of the conventional techniques is that they require search mechanisms that are time consuming and impractical for wire speed applications. Laskshman, for example, takes a different approach and divides the tuple into several dimensions, for example 5 dimensions, handling each dimension separately, allowing parallel processing (see for example FIG. 3) and avoiding the handling of mapping of a multiple tuples into a single hash address.

Another conventional technique used to store tuples is the use of a Content Addressable Memory (CAM). A CAM is an associative memory device that is capable of searching a list of stored information entries based on the content of the entries. On the other hand, conventional memories search based on the location of the entries in the memory. An information string is provided as an input to the CAM. The output from the CAM is the address of all of the memory locations in the CAM that contain the particular information string. In conventional memory devices, an address of a memory location is provided as input. The information string contained at that address forms the output. A unique property of CAM memories is their ability to search (i.e., compare to the information string) all of the entries in the CAM table simultaneously. This ability to perform simultaneous searching greatly increases the speed with which memory searches can be performed relative to conventional memories that require a sequential read and compare procedure. The simultaneous search capability is achieved, in part, by including a separate comparator means at each memory location in the CAM device. However, a CAM is complicated in terms of hardware required to implement. For large address spaces a CAM is simply infeasible to implement.

U.S. Pat. No. 5,414,704 ('704) discloses a way of doing source address and destination address lookups for use in a packet data communication system. A way of searching a relatively large database is described, using a combination of programmable hash algorithms. In the hashing technique used in '704 N-bits are hashed into N-bits. Clearly, such a solution is not practical when the address space is large as would be in the case of a communication network. Though '704 discloses the use of a content addressable memory (CAM) in parallel to the hash function, the present invention uses a much improved method.

U.S. Pat. No. 5,708,659 ('659) discloses performing hashing on certain packet headers. In '659 a predetermined number of bits from the packet address information is selected to use a hash key. This hash key is then used to compute a table address. The contents of the table at that address are compared with the packet address information. If it matches, the packet is transmitted over the port associated with that particular destination address. If it does not match, the table address is incremented by one, and the contents of the new table location identified by the incremented address are compared with the packet address information.

However, '659 but does not teach the method and technique on how to associate a packet with an existing flow in the system. An existing flow in the system refers to one or more packets flowing through the system that was already identified and newly arrived packet needs to be directed to the same packet processor for efficient processing.

Similarly, in U.S. Pat. No. 5,920,900 ('900) a translation is performed by using a programmable hashing technique on an input number to generate a hashed number. In '900, a subset of the hashed number bits are used to index a first hash table. If a collision does not occur in the first hash table, an entry contains an index into an output table which contains the desired translated output number. If a collision occurs, an entry in the first hash table contains a pointer to a first resolution table area in a second hash table. The first resolution table area contains entries which are indexed by additional bits selected from the hashed number in accordance with a mask field in the first hash table location. If collisions occur in the resolution table, a new resolution table is created and the process is repeated. The resolution process thus proceeds in stages until all input numbers have been translated. As can be seen, '900 deals with the problem of packet collision but does not address the issue of association between packets forming a full process flow. Furthermore, all of the above-mentioned conventional techniques posses very limited capabilities of scalability of the solution. Therefore, they are unsuitable for handling the increasing demand for high-speed packet processing at wire speed.

Additionally, it is desirable to associate packet flow with the 7$^{th}$ layer (Application layer) of the Open Systems Interconnection (OSI) 7-layer model. The OSI 7-layer model is a commonly used framework for defining standard for linking heterogeneous computers that form part of a network. OSI uses a concept of layering whereby communication functions are partitioned into a vertical set of layers. Each layer performs a related subset of functions required for communication between two nodes in a computer network system. The seven layers in the model are Physical layer, Data link layer, Network layer, Transport layer, Session layer, Presentation layer and Applications layer. The Physical layer is concerned with the transmission of unstructured bit streams over a physical link. It deals with the mechanical, electrical, and procedural characteristics to establish and maintain the physical link. The Data link layer provides for the reliable transfer of data across the physical link. It sends blocks of data with a necessary synchronization, error control and flow control. The Network layer provides all upper layers with independence from the data transmission and switching technologies used to connect systems. It is responsible for establishing maintaining and terminating connections. The Transport layer avoids reliable and transparent transfer of data between end points. It provides end-to-end error recovery and flow control. The Session layer provides the control structure for communication between applications. It establishes manages and terminates sessions between cooperating applications. The Presentation layer performs useful transformations on data to provide a standardized application interface and provides common communication services. Such services include encryption, text compression and any formatting. Finally the Application layer provides user-level services to the users of the environment. Examples of such services are transaction service, file transfer, and network management. Therefore, associating packet flow with the 7$^{th}$ layer (Application layer) of the Open Systems Interconnection (OSI) 7-layer model provides for better network management.

II. SUMMARY OF THE INVENTION

To solve the above-mentioned problems in the conventional technologies, it is an object of the present invention is to provide an apparatus which is capable of accepting a packet tuple and uniquely identify it with an existing flow of packets in the system, or alternatively identify it as a new flow. The processing of packet tuples should be performed at wire speeds. By being able to correlate a stream of related packets to a single packet processor, this invention allows the monitoring and management of the system up to the application layer, or the seventh layer of the 7-layer Open Systems Interconnection (OSI) communication model. Furthermore, it allows for the efficient data processing of such packets as all the processing is performed by the same packet processing unit.

It is a further object of this invention to provide a method for transforming a large tuple number associated with a packet into a reduced bit count number while maintaining the unique identification of each flow that the packet is a part of. Another object of this invention is to generate a reduced bit number from a large number based on hashing techniques incorporating certain improvements allowing the generation of "white hashing" numbers. Because of such an improved hashing, though tuples may be highly localized they will still be spread throughout the much more limited range of the hashed numbers. This means that though tuples may poses a locality in the numbers, i.e., are in close proximity to each other, they will still be spread evenly throughout the limited range of the reduced number range.

To meet the objectives of the present invention there is provided a data packet classifier to classify a plurality of N-bit input tuples, said classifier comprising a hash address generator to generate a plurality of M-bit hash addresses from said plurality of N-bit input tuples, wherein M is significantly smaller than N; a memory having a plurality of memory entries, said memory being addressable by said plurality of M-bit hash addresses, each such address corresponding to a plurality of memory entries, each of said plurality of memory entries capable of storing one of said plurality of N-bit tuples and an associated process flow information; a comparison unit to determine if an incoming N-bit tuple can be matched with a stored N-bit tuple, wherein said associated process flow information is output if a match is found and wherein a new entry is created in the memory for the incoming N-bit tuple if a match is not found.

Preferably the data packet classifier further comprises a content addressable memory (CAM) to store overflowing N-bit tuples and their corresponding process flow information wherein said overflowing N-bit tuple can not be stored in the memory.

Preferably the process flow information in the memory comprises a flow identification number.

Preferably the process flow information in the memory can be updated.

Preferably, an entry in the memory can be deleted.

Preferably searching for an entry in the memory can be ceased when a kill-process command is received.

Preferably the process flow information in the CAM comprises a flow identification number.

Preferably the process flow information in the CAM can be updated.

Preferably an entry in the CAM can be deleted.

Preferably searching for an entry in the CAM can be ceased when a kill-process command is received.

Still preferably, the data packet classifier is further capable of generating a trap if both the memory and the CAM are full.

Still preferably both the memory and CAM are searched in parallel.

Still preferably N>96.

Still preferably the hash address generator performs hashing on a first 96 bits of an associated N-bit tuple.

Still preferably a comparison of tuple stored in the memory and an incoming tuple is performed using three 32-bit comparators.

Another aspect of the present invention is a network system comprising a plurality of nodes, each of said nodes having a unique N-bit tuple, each of said plurality of nodes comprising a data packet classifier, said address classifier comprising: a hash address generator to generate a plurality of M-bit hash addresses from said plurality of N-bit input tuples, wherein M is significantly smaller than N; a memory having a plurality of memory entries, said memory being addressable by said plurality of M-bit hash addresses, each of said plurality of memory entries capable of storing one of said plurality of N-bit tuples and an associated process flow information; a comparison unit to determine if an incoming N-bit address can be matched with a stored N-bit tuple, wherein said associated process flow information is output if a match is found and wherein a new entry is created in the memory for the incoming N-bit tuple if a match is not found.

Yet another aspect of the present invention is a method of generating an M-bit hash address from an N-bit input tuple comprising: splitting said N-bit input tuple into a first range of X bits and a second range of Y bits wherein X is equal to or smaller than M; applying a hash function to said X bits to generate a white hash address with Z bits wherein Z is equal to or smaller than M; creating said M-bit hash address by combining said Z-bit white hash address and said second range of Y bits using a Boolean operator.

Preferably X is significantly larger than Y.
Preferably X is significantly larger than Z.
Preferably the Boolean operator is an OR.
Preferably the Boolean operator is an XOR.
Preferably the Boolean operation is an AND.
Still preferably N is 104.
Still preferably X is 96 and Y is 8.
Still preferably Z is 20 and M is 20.

Still another aspect of the present invention is a computer program product, including a computer-readable medium comprising instructions, said instructions enabling a computer to perform a hashing function on an N-bit input tuple according to the following steps: splitting said N-bit input tuple into a first range of X bits and a second range of Y bits; applying a hash function to said X bits to generate a white hash address with Z bits; creating said M-bit hash address by combining said Z-bit white hash address and said second range of Y bits using a Boolean operator.

Yet another aspect of the present invention is a computer program product, including a computer-readable medium comprising instructions, said instructions comprising: a hash address generator code to enable a computer to generate a plurality of M-bit hash addresses from said plurality of N-bit input tuples, wherein M is significantly smaller than N; a memory code to enable a computer to store data in a memory having a plurality of memory entries, said memory code further enabling the computer to address said plurality of M-bit hash addresses, each of said plurality of memory entries capable of storing one of said plurality of N-bit addresses and an associated process flow information; a comparison code to determine if an incoming N-bit tuple can be matched with a stored N-bit tuple, wherein said associated process flow information is output if a match is found and wherein a new entry is created in the memory for the incoming N-bit tuple if a match is not found.

III. BRIEF DESCRIPTION OF THE DRAWINGS

The above and other objects and advantages of the present invention will become more apparent by describing in detail preferred embodiments thereof with reference to the attached drawings in which.

IV. DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

A. The Network System with a Data Packet Classifier

The preferred embodiment is described using a policy-based network. Such a network system is capable of associating the packets flowing in the system with the Application layer of the 7-layer OSI communication model. It is to be noted that, this ability to associate packet flow with the application it is related to allows for better system and network management. Further, many other enhanced functionality allows for better implementation of a policy-based network. An example of the use of this invention would be in systems that have to provide special priority to packets containing voice over IP or video over IP. Moreover, such a system also provides the ability to route the packets in a defined manner and provide billing specific information. Another example would be differentiated billing system based on the type of application data being transmitted over the network.

An example of a policy-based network system is shown in FIG. 1. The network system of FIG. 1 comprises a plurality of hosts, for example hosts 120, 130 and 140. A host can be any type of computer including, but not limited to a servers 120-1 and 120-2, a workstation 140 or a desktop Personal Computer 130. The individual hosts are connected to network 110 using network connections. It should be noted that though only four hosts are shown, the network comprises many more hosts. Each host in the network has a unique tuple. Information can ideally flow from any host in the network to any other host in the network.

Figure 3:
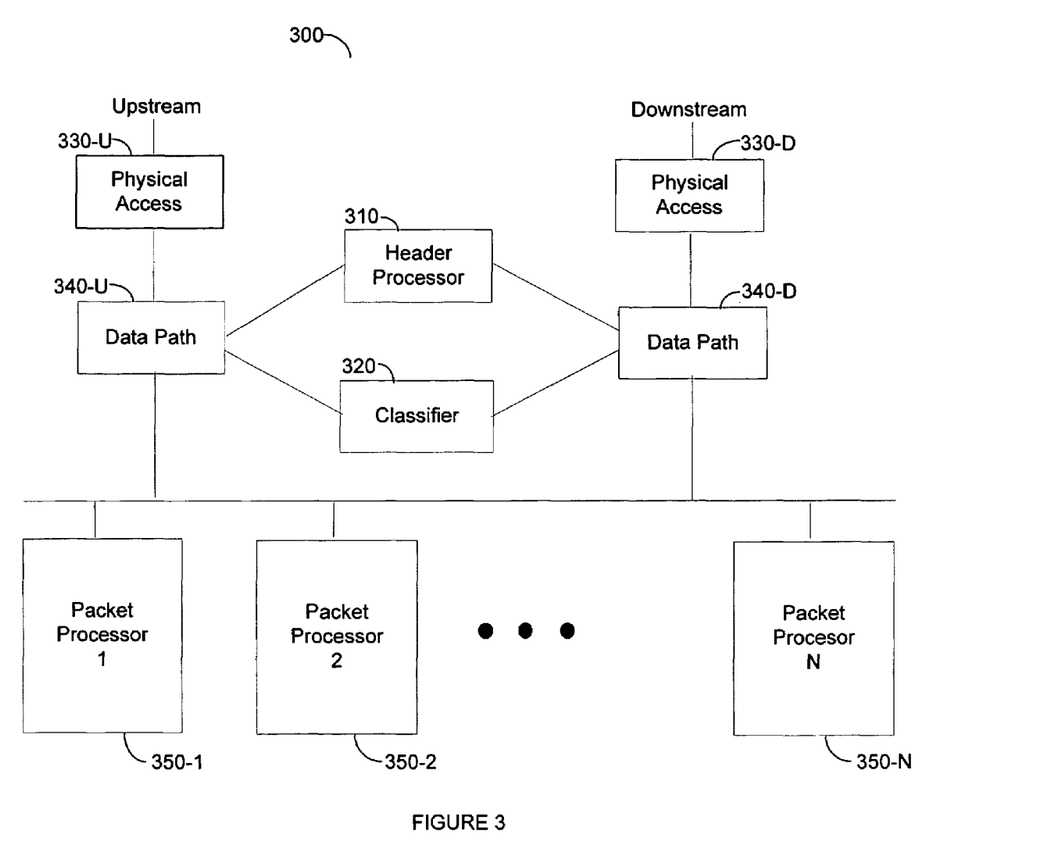
FIG. 3 shows an exemplary classification system according to the present invention.

An illustrative, non-limiting embodiment of a classifying system 300 is shown in FIG. 3 and comprises physical access units 330-U and 330-D, data path units 340-U and 340-D, a header processor 310, and a classifying unit 320. Also, system 300 comprises a plurality of packet processors PP1 to PPN. In a preferred embodiment, system 3300 at least partially constitutes a network component, and the network component can be located at a node of a network or between nodes of the network. In an alternative embodiment, the network component can be directly coupled to more than two nodes of the network.

Physical access units 330-U and 330-D comprise standard layer one and layer two components that input and capture data packets travelling upstream and downstream, respectively, from one node to another node of the network. Physical access units 330 can be created from one or more commercially available hardware units known as physical access ("PHY") devices, and media access control ("MAC") devices. Physical access unit 330-D is similar to the physical access unit 330-U, except that it inputs and captures data travelling downstream from one node to another node. For example, physical access unit 330-U may input and capture data packets traveling from a first node to a second node of the network, and physical access unit 330-D may input and capture data packets traveling from the second node to the first node. Furthermore, physical access units 330-U and 330-D are not limited to inputting and capturing data packets that are transmitted between the same nodes of the network. For instance, physical access unit 330-U may input data packets that are transmitted from the first node to the second node, and the physical access unit 330-D may input data packets that are transmitted from the second node to a third node. Alternatively, physical access unit 330-U may input data packets that are transmitted from the first node to the second node, and physical access unit 330-D may input data packets that are transmitted from the third node to the first node. In another embodiment, physical access unit 330-U may input data packets that are transmitted from the first node to the second node, and physical access unit 330-D may input data packets that are transmitted from the third node to a fourth node.

The data path unit 340-U inputs and stores the data packets captured by physical access unit 330-U and performs preliminary validity and error checking operations on the data packets to ensure that they are valid and error-free. For example, data path unit 340-U may perform IP and transport control protocol ("TCP") standard checksum operations and internet protocol version 4 ("IPV4") operations to verify the validity of an incoming packet. The data path may further determine if the lengths of the data packets fall within an acceptable range of lengths. If the data packets are valid and error-free, data path unit 340-U extracts the data packet headers from the data packets and forwards them to header processor 310 and classifier 320. In addition, in a preferred embodiment, the data path unit 340-U evaluates the source IP addresses and destination IP addresses in the headers HDR and sorts the data packets based on the value of the IP addresses. For example, the data path unit 340-U may sort the data packets from the smallest source IP address to the largest source IP address. Also, if two or more data packets have the same source IP address, data path unit 340-U may sort such data packets from the smallest destination IP address to the largest destination IP address.

Once such sorting has been performed, the data path unit 340-U can easily identify packets, such as a confirmation packet that acknowledges the receipt of a data packet sent by a first node to a second node and that is transmitted from the second node to the first node. When such acknowledgment takes place, the order of the destination and source IP addresses in the confirmation packet is reversed with respect to the originally sent data packet (or packets) because the confirmation packet travels from the second node to the first node, whereas the originally sent data packet or packets travel from the first node to the second node. In other words, the sending/receiving function of the first and second nodes change depending on whether the originally sent data packet or packets are transmitted or the confirmation packet is transmitted. By sorting confirmation packets along with the corresponding original data packet or packets, system 300 can easily identify the confirmation packets corresponding to a particular data packet or packets and can confirm that the particular data packet or packets were in fact received by the target destination. Although the above sorting technique is explained in the context of confirmation packets, it is not limited to the sorting of confirmation packets, and virtually any type of data packets can be sorted, regardless of their content.

Data path unit 340-U can be created from hardware, software, or a combination of hardware and software. Also, since the structure and operation of the data path unit 340-D is similar to the structure and operation of the data path unit 340-U, a detailed description of the unit 340-D is omitted for the sake of brevity.

The header processor 310 inputs the data packet headers from data path units 340-U and 340-D and classifies the data packets by determining which rule or rules of a predetermined set of rules correspond to each of the respective headers. An illustrative example of a device that classifies data packets according to a predetermined set of rules is described in a U.S. Pat. No. 6,700,889 entitled "High Speed Apparatus and Method for Classifying a Data Packet Based on Data Values Contained In The Data Packet", by Michael Ben-Nun, and assigned to the assignee of the present application. Such application is incorporated herein by reference for all purposes. After header processor 310 classifies a data packet, it may output rule information to data path unit 340-U or 340-D. In one embodiment, the rule information contains data and/or a command that corresponds to the rule by which the data packet is classified, and data path unit 340-U or 340-D stores the rule information with the corresponding data packet so that the information can be used when the data packet is subsequently processed. Also, in a preferred embodiment, if the header of a data packet does not correspond to any of the predetermined rules, header processor 310 generates a "flow-kill" command. Such command is output to classifier 320 via data path unit 340-U or 340-D to inform classifier 320 that the corresponding data packet does not correspond to any of the predetermined rules and that there is no need to maintain a process flow for such packets.

Classifier 320 inputs the headers of the data packets and evaluates the headers to determine a specific "flow" corresponding to each of the data packets. A specific flow relates to the communications or the transfer of data packets between two computers (or nodes) of the network. For instance, data packets transmitted from a first source computer (or node) to a first destination computer (or node) of the network belong to a first flow, and data packets transmitted from the first source computer (or node) to a second destination computer (or node) belong to a second flow. By evaluating the contents of the header of a data packet, classifier 320 can determine the specific flow corresponding to the data packet.

In addition, in a full duplex communications system, downstream data packets may be transferred from a first computer (or node) to a second computer (or node), and upstream data packets may be transferred from the second computer (or node) to the first computer (or node). In such a scenario, classifier 320 may consider both the downstream and upstream data packets to correspond to the same flow. For example, assume that the first computer has an IP address "A" and the second computer has an IP address "B". If a first data packet is transmitted downstream from the first computer to the second computer, the first header of the first data packet has a source IP address that equals "A" and has a destination IP address that equals "B". As described above, the first header is extracted from the data packet via data path unit 340-D and supplied to classifier 320, and upon evaluating the first header, classifier 320 classifies the packet as belonging to the first flow. On the other hand, if a second data packet is transmitted upstream from the second computer to the first computer, for example for the purpose of acknowledging receipt of such first packet by the second computer, the second header of the second data packet would have a source IP address that equals "B" and would have a destination IP address that equals "A". In such case, data path unit 340-U extracts the second header from the data packet and outputs it to classifier 320 as described above. Then, classifier 320 evaluates the second header HDR and also classifies the second packet as belonging to the first flow. In other words, classifier 320 classifies both the first and second data packets as belonging to the first flow because they are part of the same full duplex communication between the first and second computers.

In the above example, classifier 320 determines the flow to which a data packet belongs based on the source and destination IP addresses contained in the header HDR of the data packet. In addition to determining the flow of a data packet based on the IP addresses, classifier 320 may also determine the flow based on the source and destination port values contained in the header of the data packet. For example, in a full duplex communication system, if a first downstream data packet has a source IP address "A", a source port value "A1", a destination IP address "B", and a destination port value "B1", classifier 320 may classify the first downstream data packet as belonging to a first flow. Similarly, a first upstream data packet having a source IP address "B", a source port value "B1", a destination IP address "A", and a destination port value "A1" may still be classified as belonging to the first flow. However, a second downstream data packet having a source IP address "A", a source port value "A2", a destination IP address "B", and a destination port value "B2" may be classified as belonging to a second flow. Furthermore, classifier 320 can additionally or alternatively identify a specific flow of the data packet based on the protocol value contained in the header of the data packet.

Each of the packet processors PP1 to PPN, 350-1 through 350-N, is designated to process data packets belonging to a particular flow. For example, a first packet processor (e.g. the processor PP1 350-1) may be designated to process data packets belonging to a first flow, and a second packet processor (e.g. the processor PP2 350-2) may be designed to process data packets belonging to a second flow. Since the packet processor PP1 only processes data packets belonging to the first flow, it performs the same or similar types of processing functions for all of the data packets that it receives. As a result, processor PP1 350-1 is able to predict the types of data packets that it will receive and predict the types of processing operations it will have to perform. Thus, processor PP1 350-1 is capable of utilizing parallel processing, data cache hits, and other types of processing techniques to increase its processing speed and efficiently and quickly process the data packets corresponding to the first flow. Similarly, since packet processor PP2 350-2 only processes data packets belonging to the second flow, it is able to process all of the data packets belong to the second flow in an extremely quick and efficient manner.

Also, as described above, upstream and downstream data packets that belong to the same flow are processed by a single packet processor PP1, PP2, ..., or PPN, 350-1, 350-2 through 350-N respectively. As a result, two different packet processors are not required to separately process the upstream data packets and the downstream data packets. Thus, fewer processors PP1 to PPN are required to process the data packets transmitted on the network, and the overall processing operation of the network is enhanced. In addition, as shown in FIG. 3, packet processors PP1 to PPN are connected to data path units 340-U and 340-D via a data bus. As a result of such architecture, packet processors 350 can easily be added to or removed from system 300. Thus, as the number of process flows handled by system 300 increases (or decreases), processors can be simply added to (or removed from) system 300 to accommodate the change in the number of process flows.

Classifier 320 designates which packet processors PP1 to PPN process data packets corresponding to the various flows and instructs the data path units 340-U and 340-D to output the data packets to the appropriate processor PP1, PP2, ..., or PPN. In one embodiment, classifier 320 designates which processors PP1 to PPN process which data packets in the following manner. First, as described above, classifier 320 receives a particular header of a particular data packet and determines that the particular data packet corresponds to a particular flow. Then, classifier 320 determines if any of the packet processors PP1 to PPN have previously been designated as a particular flow processor to process data packets belonging to the particular flow. If none of the processors PP1 to PPN have been previously designated as the particular flow processor, classifier 320 selects one of the processors PP1 to PPN that has not been previously designated to process data packets belonging to any flow. Then, classifier 320 designates the selected processor as the particular flow processor to process data packets corresponding to the particular flow and determines that the particular data packet should be output to the particular data processor. In another embodiment, classifier 320 receives information from each of the packet processors PP1 to PPN indicating the relative load on each of the packet processors PP1 to PPN. Then, classifier 320 assigns a new flow to the packet processor PP1, PP2, ..., or PPN that has the smallest load. As a result, the efficiency of system 300 is enhanced because the loads of the packet processors PP1 to PPN are dynamically balanced. On the other hand, if classifier 320 determines that the particular data packet belongs to the particular flow and determines that one of the packet processors PP1 to PPN has previously been designated as the particular flow processor, classifier 320 determines that the particular data packet should be output to the particular data processor.

However, as mentioned above, if header processor 310 evaluates a header and determines that the corresponding data packet cannot be classified according to one of the predetermined rules, header processor 310 outputs the "flow-kill" command to the classifier 320 via data path unit 340-U or 340-D. When classifier 320 receives the flow-kill command, the classifier 320 is instructed not to determine the flow to which the data packet belongs. In other words, if a data packet does not satisfy any of the predetermined rules, header processor 310 determines that system 300 has no significant use for the data packet or that the data packet has been received in error. Thus, header processor 310 outputs the "flow-kill" command to instruct classifier 320 not to waste time determining the flow corresponding to the data packet. As a result, the overall processing speed of system 300 is increased. Also, if one of the processors PP1 to PPN had not previously been designated by classifier 320 to process data packets belonging to the "flow" of the data packet, the "kill-flow" command prevents classifier 320 from unnecessarily determining that the data packet belongs to a new flow and from unnecessarily designating an additional processor PP1, PP2, ..., or PPN to process the data packet belonging to the new flow. Consequently, by generating the "flow-kill" command, header processor 310 prevents valuable system resources (i.e. one of the processors PP1 to PPN) from being wasted by being dedicated to processing the data packet that is not useful or that has been erroneously received.

In one embodiment, the "flow-kill" command is additionally or alternatively output to data path 340-U or 340-D. When data path 340-U or 340-D receives such command, it deletes or otherwise discards the erroneous or useless data packet stored in the data path 340-U or 340-D.

In any event, after classifier 320 determines that a particular data packet should be output to the particular flow processor, it outputs flow information to the data path unit 340-U or 340-D. The flow information comprises flow identification data, packet processor data, and other control and/or status information. The flow identification data indicates the flow (i.e. the particular flow) to which the particular data packet belongs, and the packet processor data identifies the packet processor PP1, PP2, . . . , or PPN (i.e. the particular packet processor) to which the particular data packet should be supplied. In response to the flow information, the data unit 340-U or 340-D outputs the particular data packet to the particular packet processor.

Each host in the network may include a system 200 further comprising a data packet classifier 320. An exemplary and non-limiting data packet classifier 320 further comprises a hash address generator 322, a hash bucket memory 232 and a comparison unit 324. A preferred embodiment of a data packet classifier is described subsequently with reference to FIG. 4. A data packet classifier 320 in a network system 200 is required to process a substantial number of flows. Additionally, each such flow is associated with a plurality of packets all of which move around the various components of the network.

The host that sends digital information is called the source and the host that receives the information is called the destination. Each message or information flow is divided into one or more packets. Each packet is processed separately and sent from the source to the destination. Such a packet contains a header, as noted above. The packet header is uniquely identified by a tuple, typically having 104 bits. Since a bit can have a value of a 0 or 1, and 104 bits are used, therefore no less than $2^{104}$ unique tuples are possible. However, if each tuple is uniquely identified with its entire number, the number of possible tuples to be handled and classified becomes substantially large for any practical implementation of the system. A real time processing of such a large number of tuples is likely to be impossible.

Extensive simulation studies were performed to determine the maximum possible number of information flows in a network during a short period of time. These simulation studies revealed that that allowing for a million different flows at a given relatively short period of time in a system is sufficient for providing a high quality of service for the system. For more detailed information on such simulations see, for example, Stiliadis, D. "High-Speed Policy-Based Packet Forwarding Using Efficient Multi-Dimensional Range Matching" *ACM SIGCOMM* 1998 published in February 1998, or Lakshman et. al "High-Speed Policy-based Packet Forwarding Using Efficient Multi-Dimensional Range Matching" ACM SIGCOMM Computer Communication Review, vol. 28, No. 4, 1998.

B. The Data Packet Classifier

Figure 4:
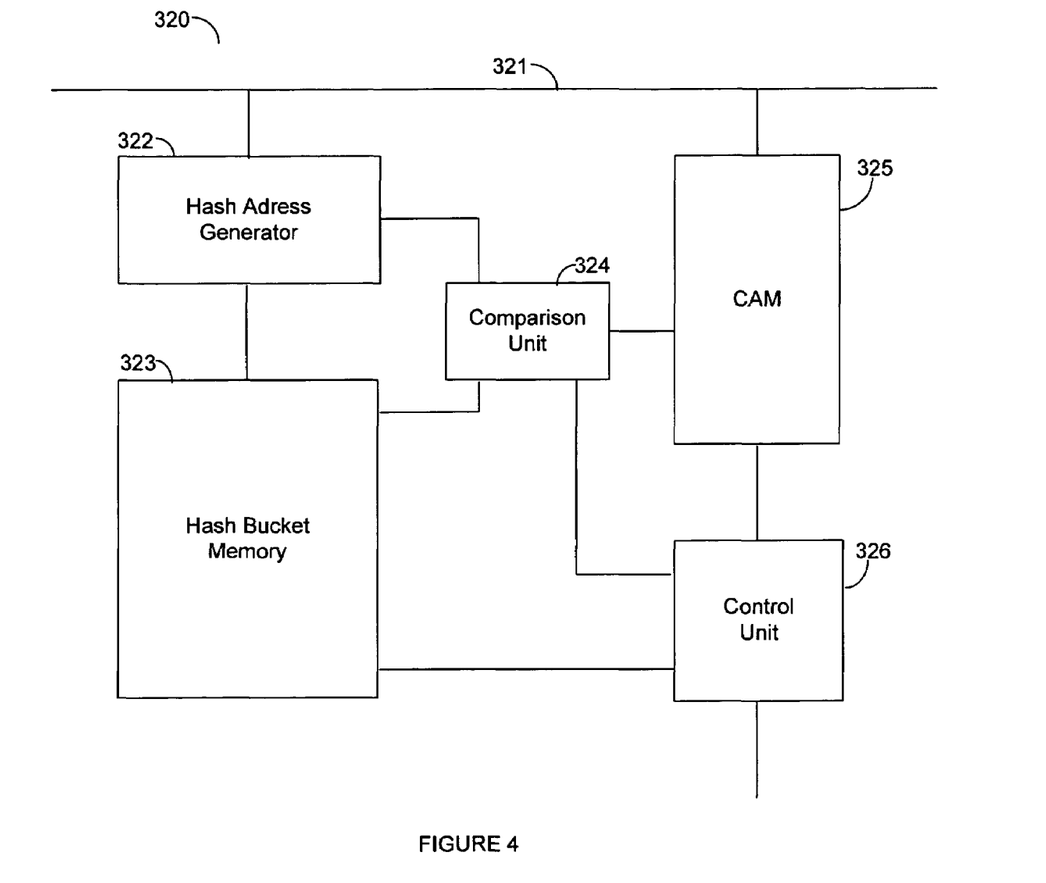
FIG. 4 is a block diagram of a preferred embodiment of a data packet classifier according to the present invention.

FIG. 4 shows a preferred embodiment of a data packet classifier 320. 104 bit tuples are received by a hash address generator 322 over connection 321. Hash address generator 322 is capable of transforming the 104 bits of the tuple into a 20bit long number, using a hash function explained in additional detail below. Therefore, using the results of the hashing, $2^{20}$ or more than a million unique digital process flows can be represented. The operation of Hash Generator 322 is further discussed below. It should be noted that though the preferred embodiment is described using a tuple with 104 bits, tuples of any length can be used without deviating from the spirit of the invention. Likewise, the hash address can be of any length less than the length of the tuple to be within the scope of the present invention. However, in a preferred embodiment the number of possible unique tuples should be significantly larger, for example two orders of magnitude larger, than the number of unique hash tuple numbers generated by Hash Generator 322. For example, if 20-bits are used to comprise the hash address than at least 28 bits should be used for the tuple, since $2^8$ is equal to 128, and hence over two orders of magnitude larger than the hash address. If a 32-bit hash address is used, and three orders of magnitude difference are required then the tuple should be at least 42 bits long. This is because $2^{10}$ is 1024, and $2^{32}*2^{10}=2^{42}$. Hereinafter the assumption will be for a 20-bit hash address generated from a 104-bit tuple, without limiting the scope of the disclosed invention. It would be apparent to those skilled-in-the-art that a ration of 1:100 would sufficiently define the term "significantly larger" or "significantly smaller" as the case may be.

The 20-bit hash address generated by Hash Generator 322 is used to access hash bucket memory 323. The architecture of hash bucket memory 323 is further shown in FIG. 5. Each hash address corresponds to a hash bucket, for example $HB_0$. Hash bucket memory 323 is designed in such a way that each hash bucket is capable of storing, for example, eight separate entries, in cells $C_1$, $C_2$, through $C_J$, of a hash bucket address, for example, $HB_1$. As noted in the background section, it is possible that two different tuples, on applying the hashing function, result in the same hash address. Hash bucket memory 323 is therefore designed so that it has a plurality of entries, for example eight separate entries, for each hash address accessing the memory unit. The determination of the specific number of entries for each hash address is chosen based on extensive system simulations balanced with the need to ensure wire speed performance. However, as technology develops, additional entries may be added as necessary. Providing eight different entries for a hash address would ensure eight different entries could be stored in the same hash bucket. That is up to eight different tuples resulting in the same hash address can still be stored in the hash table, overcoming some of the significant deficiencies of flow-cache architectures, as noted by Lakshman et. al in "High-Speed Policy-based Packet Forwarding Using Efficient Multi-Dimensional Range Matching", pp. 204-205. This substantially reduces the chance of a tuple being bounced off from the hash table because a particular hash bucket is full, and overcomes the needs for more complex multi-dimensional processing solutions suggested by Lakshman et al.

Figure 5:
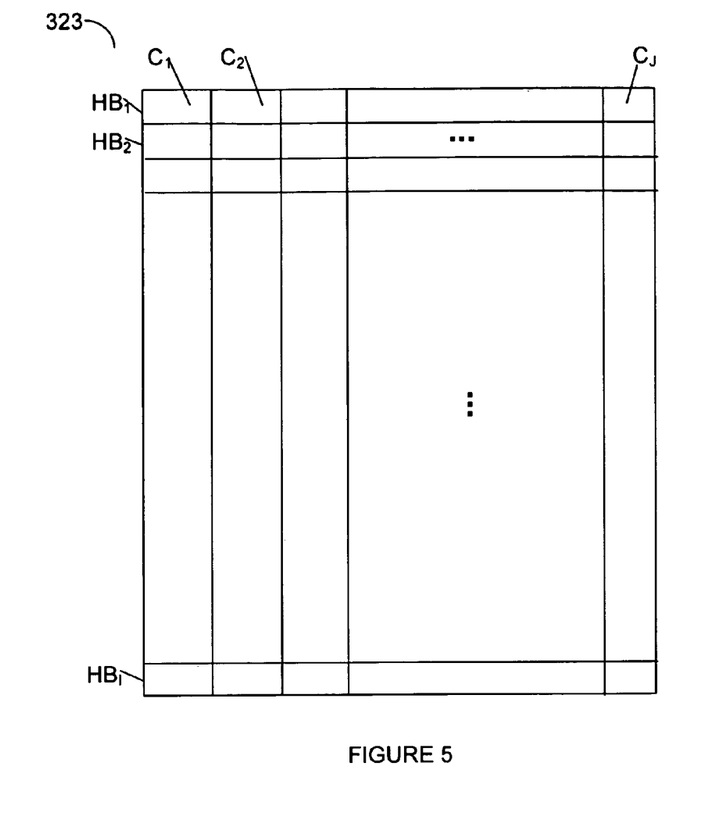
FIG. 5 is a schematic diagram of the memory comprising the hash buckets.

Hash address generator 322 performs hashing on a tuple associated with an incoming data packet. The result of such a hashing is used to identify a hash bucket that is associated with the incoming tuple. The comparison unit 324 which may also be attached to a CAM 325, compares data associated with the incoming data packet and the data in each of the entries, for example the eight entries, of hash bucket memory 323. Comparison unit 324 determines that a successful match has resulted if a match is found between the incoming tuple over connection 321 and an entry in hash bucket memory 323. Upon finding a successful match, the stored process flow information corresponding to the matched entry is output. This process flow information includes a unique ID. If no match is found with an existing entry, a new entry is created corresponding to the incoming packet. The new entry is placed in the next available cell, for example cell $C_1$, of a hash bucket corresponding to the hash address of the tuple, for example $HB_2$.

According to another improvement, a CAM 325 is provided as an additional storage facility to deal with incoming packets having tuples that produce a hash address of a hash bucket that is already full, for example, when eight cells are full in a hash bucket with previous tuples all being mapped to the same hash bucket. CAM 325 is accessed with the full tuple corresponding to the incoming packet arriving over connection 321. Though remote, it is possible that more than, for example, eight unique tuples would hash into a single hash number, causing an overflow condition in a hash bucket. CAM 325 is used for storing process flow information related to such packets having tuples that produce hash addresses that represent hash buckets that are already full. CAM 325 is accessed with the full tuple. Simulations have shown that a CAM 325 containing, for example, 8K entries, is sufficient to reduce the risk of inability to handle a tuple in classifier unit 320 to a practically negligible number. As systems and technology develop, it is easy to add entries to CAM 325 to handle additional requirements. Hence, the disclosed invention allows for a highly modular solution that can be expanded as newer technologies are made available.

Data packet classifier 320 is also capable of updating the process flow information associated with a data packet. Entries stored in both hash bucket memory 323 as well as CAM 325 can be updated. Data packet classifier 320 is also capable of deleting an entry in hash bucket memory 323.

If CAM 325 also gets filled up and an incoming packet cannot be stored in hash bucket memory 323 or in CAM 325, a trap is generated. Such a trap indicates that the corresponding incoming packet cannot be handled by data packet classifier 320.

Additionally a "kill process" command can be issued to data packet classifier 320, as noted above. On receiving a "kill process" command, data packet classifier 320 ceases searching hash bucket memory 323 as well as CAM 325.

As noted before, if in the search of hash bucket memory 323 and CAM 325, which may take place in parallel, no match is found then a new entry is created. Such a new entry is created in hash bucket memory 323 if not all corresponding hash bucket cells have been filled up. If space exists in hash bucket memory 323 to store the entry, it is registered in hash bucket memory 323. As part of the entry, full tuple information, the flow identification and other control information are stored. This stored information will be later attached to each incoming packet incoming with a tuple that matches the corresponding entry.

After this information is attached, the incoming packet is sent to a packet processor, for example PP1 350-1.

The ability to update an entry is provided because incoming packets may have undergone further processing. Such a processing may create a need for making further changes in the stored entry. An update command is used to perform such an updating. When an update command is initiated, the control information associated with the tuple is modified.

In the case where all entries, or cells, of hash bucket memory 323 corresponding to a hash bucket that is dedicated for a specific hash address are occupied, the entry is written into CAM 325. Simulations have shown that only a fraction of the 8K hash buckets associated with CAM 325 are used even when over a million process flow move through the system.

An important advantage of the architecture of system 200 in general, and classifier 320 in particular, is its ability to easily scale as system demands grow and require handling of millions of more process flow in short periods of time and at wire speed.

C. The Hashing Function

Another aspect of the invention is an improved method to perform hashing that is used by the Hash Address Generator. A preferred embodiment of this hash function is described using FIG. 6. Conventionally, the hashing function is applied to all the bits corresponding to a tuple. Instead of applying the hash function on all 104 bits of the tuple, the tuple is divided into two portions, 96 bits of the tuple, including the source IP address (32-bits), destination IP address (32-bits), source port (16-bits), and destination port (16-bits), and the remaining 8-bit indicating the protocol type. Hashing is performed on the 96 bits. Again it should be noted that the fixed number of bits (104, 96, 8, etc) used to describe the preferred embodiment are merely illustrative. The division of bits can be done in any convenient manner without deviating from the spirit of the invention.

Figure 6:
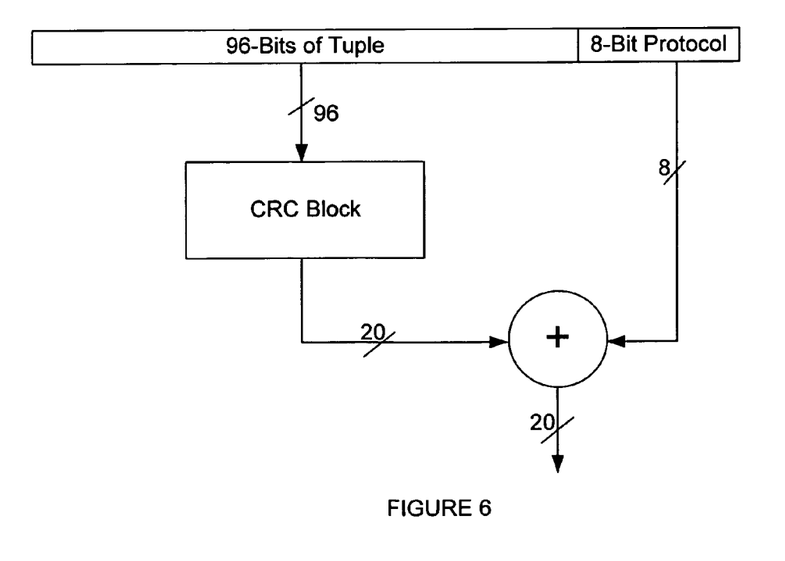
FIG. 6 is a block diagram illustrating the hashing function of the Hash Generator.

While any hash function could be used it is necessary to ensure that the specific hash function used generates a "white hash address". This would mean that when taking a group of tuples, which in many times can be different in only a minimal way from other tuples, Hash Generator 322 will still generate hash numbers that are equally spread through the range of addresses spanned by the 20 bit address space available. While less than the 96 bits could be used for the hash function (in fact, as little as 84 bits would suffice), it is advisable to use the maximum number of bits possible in order to increase the spread and effectiveness of the hash function. The reason for selecting 96 bits specifically is that this allows the use of three 32-bit comparators to compare the incoming tuple and the memory content and get a unique comparison result and further permit the use of six standard 16-bit memory banks to hold the memory content. The hash operation performed on the 96 bits result in a preliminary 20 bit hash address. This is then followed by a logical "OR" or an "XOR" operation performed between the 20-bit result of the preliminary hash operation and the remaining 8 bits from the tuple that did not form part of the hashing operation. Instead of performing a logical "OR" or an "XOR" a Boolean "AND" operation can also be performed. Such a two-step hashing operation results in producing a final hash address that spans the entire 20-bit hash address range.

D. Computer Program Products

Another important aspect of the present invention is a computer program product to enable a computer to perform the hashing operation according to the present invention. The preferred embodiment of such a program product includes a computer-readable medium. The computer-readable medium comprises instructions to enable a computer to perform a hashing function on an N-bit input tuple. The instructions enable the computer to split the N-bit input tuple into a first range of X bits and a second range of Y bits. The instructions further enable the computer to apply a hash function to the X bits to generate a white hash address with Z bits. Further instructions enable the computer to create a M-bit hash address by combining the Z-bit white hash address and the second range of Y bits using a Boolean operator. The Boolean operator could be a logical "Or" or an "XOR".

Another important aspect of the present invention is a computer program product, including a computer-readable medium comprising instructions to implement the data packet classifier in software. The instructions comprise a hash address generator code to enable a computer to generate a plurality of M-bit hash addresses from a plurality of N-bit input tuples, wherein M is significantly smaller than N, i.e., $2^N$ will represent a number at least two orders of magnitude larger than $2^M$, e.g., if M is equal to 20 than N is equal to or greater than 28. It would be apparent to those skilled-in-the-art that a ration of 1:100 would sufficiently define the term "significantly larger" or "significantly smaller" as the case may be. The instructions further comprise a memory code to enable a computer to store data in a bucket memory, each bucket having a plurality of memory entries. The memory code further enables the computer to address the plurality of M-bit hash addresses. Each of the plurality of memory entries capable of storing one of the plurality of N-bit tuples and an associated process flow information. The instructions further comprise a comparison code to determine if an incoming N-bit tuple can be matched with a N-bit tuple stored in one of said plurality of memory entries corresponding to the M-bit hash address. The associated process flow information is output if a match is found and new entry is created in the bucket memory for the incoming N-bit tuple if a match is not found.

It should be noted that the computer readable medium includes any fixed media including, but not limited to, floppy disk, hard disk, CD, chips, tapes, cartridges with ICs, etc. The computer readable media also includes instructions transmitted through a network or downloaded from the Internet.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. A data packet classifier to classify a plurality of N-bit input tuples, said classifier comprising:
    a hash address generator to generate a plurality of M-bit hash addresses from said plurality of N-bit input tuples, wherein M is significantly smaller than N;
    a hash bucket memory having a plurality of memory entries, said memory being addressable by said plurality of M-bit hash addresses, each such address corresponding to a plurality of memory entries, each of said plurality of memory entries storing one of said plurality of N-bit tuples mapped to said M-bit hash address and at least an associated process flow information, wherein at least one of said memory entries corresponds to a full duplex process flow between first and second network nodes; and
    a comparison unit to determine if an incoming N-bit tuple of a packet can be matched with a stored N-bit tuple, wherein said associated process flow information is output if a match is found and wherein a new entry is created in the memory for the incoming N-bit tuple if a match is not found, said data packet classifier further making said comparison between said incoming N-bit tuple and said stored N-bit tuple so as to identify said full duplex process flow regardless of whether the packet flows upstream or downstream between said first and second network nodes.

2. The data packet classifier of claim 1 further comprising:
    a content addressable memory (CAM) to store at least an overflowing N-bit tuple and its corresponding flow information wherein said overflowing N-bit tuple cannot be stored in said hash bucket memory.

3. The data packet classifier of claim 2 wherein said process flow information in said CAM comprises a process flow identification number.

4. The data packet classifier of claim 2 wherein said process flow information in said CAM can be updated.

5. The data packet classifier of claim 2 wherein an entry in said CAM can be deleted.

6. The data packet classifier of claim 2 wherein searching for an entry in said CAM can be ceased when a kill-process command is received.

7. The data packet classifier of claim 2 further generating a trap if both said hash bucket memory and said CAM are full.

8. The data packet classifier of claim 2 wherein both said hash bucket memory and said CAM are searched in parallel.

9. The data packet classifier of claim 2 wherein N>96.

10. The data packet classifier of claim 9 wherein said hash address generator performs hashing on a first 96 bits of an associated N-bit tuple.

11. The data packet classifier of claim 10 wherein a comparison of tuple stored in the memory and an incoming tuple is performed using three 32-bit comparators and standard 16 or 32 bit wide memories.

12. The data packet classifier of claim 1 wherein said process flow information in said hash bucket memory comprises a flow identification number.

13. The data packet classifier of claim 1 wherein said process flow information in said hash bucket memory can be updated.

14. The data packet classifier of claim 1 wherein an entry in said hash bucket memory can be deleted.

15. The data packet classifier of claim 1 wherein searching for an entry in said hash bucket memory can be ceased when a kill-process command is received.

16. A network interface that processes data packets transmitted on a network, comprising:
    a first data path unit that inputs only data packets transmitted upstream on the network, wherein a first data packet input to the first data path unit comprises a first header, said first header comprising a first source address and a first destination address;
    a second data path unit that receives only data packets transmitted downstream on the network, wherein a comprises a second header, said second header comprising a second source address and a second destination address; and
    a data packet classifier that inputs the first header from the first data path unit and the second header from the second data path unit, evaluates the first header to determine a flow corresponding to the first data packet, and evaluates the second header to wherein the first source address is different from the second source address and the first destination address is different from the second destination address, and wherein the first data packet and the second data packet belong to the same flow; and, wherein said data packet classifier further comprising:
    a hash address generator to generate a plurality of M-bit hash addresses from said plurality of N-bit input tuples, wherein M is significantly smaller than N;
    a hash bucket memory having a plurality of memory entries, said memory being addressable by said plurality of M-bit hash addresses, each such address corresponding to a plurality of memory entries, each of said plurality of memory entries storing one of said plurality of N-bit tuples mapped to said M-bit hash address and at least an associated process flow information; and
    a comparison unit to determine if an incoming N-bit tuple can be matched with a stored N-bit tuple, wherein said associated process flow information is output if a match is found and wherein a new entry is created in the memory for the incoming N-bit tuple if a match is not found, said data packet classifier being further making said comparison between said incoming N-bit tuple and said stored N-bit tuple regardless of whether the packet flows upstream or downstream.

17. The network interface of claim 16 further comprising:
a content addressable memory (CAM) to store overflowing N-bit tuples and their corresponding process flow information wherein said overflowing N-bit tuple cannot be stored in said hash bucket memory.

18. The network interface of claim 17 wherein said process flow information in said CAM comprises a process flow identification number.

19. The network interface of claim 17 wherein said process flow information in said CAM can be updated.

20. The network interface of claim 17 wherein an entry in said CAM can be deleted.

21. The network interface of claim 17 wherein searching for an entry in said CAM can be ceased when a kill-process command is received.

22. The network interface of claim 17 further generating a trap if both said hash bucket memory and said CAM are full.

23. The network interface of claim 17 wherein both said hash bucket memory and said CAN are searched in parallel.

24. The network interface of claim 17 wherein N>96.

25. The network interface of claim 17 wherein said hash address generator performs hashing on a first 96 bits of an associated N-bit tuple.

26. The network interface of claim 25 wherein a comparison of tuple stored in the memory and an incoming tuple is performed using three 32-bit comparators.

27. The network interface of claim 16 wherein said process flow information in said hash bucket memory comprises a process flow identification number.

28. The network interface of claim 16 wherein said process flow information in hash bucket memory can be updated.

29. The network interface of claim 16 wherein an entry in said hash bucket memory can be deleted.

30. The network interface of claim 16 wherein searching for an entry in said hash bucket memory can be ceased when a kill-process command is received.

31. A method of generating an N-bit hash address from an N-bit input tuple comprising:
   a) splitting said N-bit input tuple into a first range of X bits and a second range of Y bits;
   b) applying a hash function to said X bits to generate a white hash address with Z bits; and
   c) creating said M-bit hash address by combining said Z-bit white hash address and said second range of Y bits using a Boolean operator.

32. The method of claim 31 wherein X is significantly larger than Y.

33. The method of claim 31 wherein X is significantly larger than Z.

34. The method of claim 31 wherein said Boolean operator is an OR.

35. The method of claim 31 wherein said Boolean operator is an XOR.

36. The method of claim 31 wherein N is 104.

37. The method of claim 36 wherein X is 96 and Y is 8.

38. The method of claim 37 wherein Z is 20 and M is 20.

39. The method of claim 31 wherein said Boolean operator is an "AND".

40. A computer program product, including a computer-readable storage medium stored with computer-executable instructions, said instructions enabling a computer to perform a hashing function on an N-bit input tuple according to the following steps:
   a) splitting said N-bit input tuple into a first range of X bits and a second range of Y bits;
   b) applying a hash function to said X bits to generate a white hash address with Z bits; and
   c) creating said M-bit hash address by combining said Z-bit white hash address and said second range of Y bits using a Boolean operator.

41. The program product of claim 40 wherein X is significantly larger than Y.

42. The program product of claim 40 wherein X is significantly larger than Z.

43. The program product of claim 40 wherein said Boolean operator is an OR.

44. The program product of claim 40 wherein said Boolean operator is an XOR.

45. The program product of claim 40 wherein N is 104.

46. The program product of claim 45 wherein X is 96 and Y is 8.

47. The program product of claim 46 wherein Z is 20 and M is 20.

48. The computer program product of claim 40 wherein said Boolean operator is an "AND".

49. A computer program product, including a computer-readable storage medium stored with computer-executable instructions, said instructions comprising:
   a hash address generator code to enable a computer to generate a plurality of M-bit hash addresses from said plurality of N-bit input tuples, wherein M is significantly smaller than N;
   a memory code to enable a computer to store data in a hash bucket memory having a plurality of memory entries, said memory code further enabling the computer to address said plurality of M-bit hash addresses, each of said plurality of memory entries storing one of said plurality of N-bit tuples mapped to said M-bit hash address and at least an associated process flow information, wherein at least one of said memory entries corresponds to a full duplex process flow between first and second network nodes; and
   a comparison code to determine if an incoming N-bit tuple of a packet can be matched with a stored N-bit tuple, wherein said associated process flow information is output if a match is found and wherein a new entry is created in the memory for the incoming N-bit tuple if a match is not found, said comparison between said incoming N-bit tuple and said stored N-bit tuple being performed so as to identify said full duplex process flow regardless of whether the packet flows upstream or downstream between said first and second network nodes.

50. The computer program product of claim 49 further comprising:
   a content addressable memory (CAM) code to enable a computer to store overflowing N-bit tuples and their corresponding process flow information in a CAM wherein said overflowing N-bit tuple cannot be stored in said hash bucket memory.

51. The computer program code of claim 50 wherein said process flow information in said CAM comprises a flow identification number.

52. The computer program code of claim 50 wherein said instructions enable a computer to update the process flow information in said CAM.

53. The computer program code of claim 50 wherein said instructions enable a computer to delete an entry in said CAM.

54. The computer program code of claim 50 wherein said instructions enable a computer to cease searching for an entry in said CAM when a kill-process command is received.

55. The computer program product of claim 50 wherein said instructions enable the computer to generate a trap if both said hash bucket memory and said CAM are full.

56. The computer program product of claim 50 wherein said instructions enable a computer to search both said hash bucket memory and said CAM in parallel.

57. The computer program product of claim 50 wherein N>96.

58. The computer program product of claim 57 wherein said hash address generator code enables a computer to performs hashing on a first 96 bits of an associated N-bit tuple.

59. The computer program product of claim 58 wherein said comparison code enables the computer to compare an address stored in said hash bucket memory and an incoming tuple using three 32-bit comparators.

60. The computer program code of claim 49 wherein said process flow information in said hash bucket memory comprises a flow identification number.

61. The computer program code of claim 49 wherein said instructions enable a computer to update the process flow information.

62. The computer program code of claim 49 wherein said instructions enable a computer to delete an entry in said hash bucket memory.

63. The computer program code of claim 49 wherein said instructions enable a computer to cease searching for an entry in said hash bucket memory when a kill-process command is received.

64. A network interface that processes data packets transmitted on a network, comprising:
- a first data path unit that inputs only downstream data packets transmitted downstream on the network, wherein the downstream data packets comprise downstream headers, respectively;
- a second data path unit that inputs only upstream data packets transmitted upstream on the network, wherein the upstream data packets comprise upstream headers, respectively;
- a classifier unit that inputs the downstream headers from the first data path unit and the upstream headers from the second data path unit, evaluates the downstream headers to respectively determine flows corresponding to the downstream data packets, and evaluates the upstream headers to respectively determine flows corresponding to the upstream data packets wherein said data packet classifier further comprising:
- a hash address generator to generate a plurality of M-bit hash addresses from said plurality of N-bit input tuples, wherein M is significantly smaller than N;
- a hash bucket memory having a plurality of memory entries, said memory being addressable by said plurality of M-bit hash addresses, each such address corresponding to a plurality of memory entries, each of said plurality of memory entries storing one of said plurality of N-bit tuples mapped to said M-bit hash address and at least an associated process flow information;
- a comparison unit to determine if an incoming N-bit tuple can be matched with a stored N-bit tuple, wherein said associated process flow information is output if a match is found and wherein a new entry is created in the memory for the incoming N-bit tuple if a match is not found, said data packet classifier being further making said comparison between said incoming N-bit tuple and said stored N-bit tuple regardless of whether the packet flows upstream or downstream; and,
- packet processors at least indirectly coupled to the classifier unit, wherein a first data packet is a downstream data packet having a downstream header comprising a first source address and a first destination address,
- wherein a second data packet is an upstream data packet having an upstream header comprising a second source address and a second destination address,
- wherein the first source address is different from the second source address and the first destination address is different from the second destination address,
- wherein the first data packet and the second data packet belong to the same flow, and
- wherein the classifier unit selects a first packet processor of said packet processors to process both upstream data packets and downstream data packets corresponding to a first the first data packet and the second data packet belonging to the same flow.

* * * * *

UNITED STATES PATENT AND TRADEMARK OFFICE
CERTIFICATE OF CORRECTION

PATENT NO. : 7,436,830 B2  Page 1 of 1
APPLICATION NO. : 10/953562
DATED : October 14, 2008
INVENTOR(S) : Ben-Nun et al.

It is certified that error appears in the above-identified patent and that said Letters Patent is hereby corrected as shown below:

Title Page Item (75) should read (75)  Inventors: Ofer WEILL
  Modiin, Israel

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,436,830 B2 |
| APPLICATION NO. | : 10/953562 |
| DATED | : October 14, 2008 |
| INVENTOR(S) | : Ben-Nun et al. |

Page 1 of 1

It is certified that error appears in the above-identified patent and that said Letters Patent is hereby corrected as shown below:

Title Page Item (75), Inventors, fourth inventor should read

Ofer WEILL
Modiin, Israel

This certificate supersedes the Certificate of Correction issued June 1, 2010.

Signed and Sealed this

Twenty-ninth Day of June, 2010

David J. Kappos
*Director of the United States Patent and Trademark Office*